(12) United States Patent
Barna (10) Patent No.: US 9,686,488 B2
(45) Date of Patent: Jun. 20, 2017

(54) IMAGING SYSTEMS WITH FLICKER MITIGATION AND HIGH DYNAMIC RANGE (71) Applicant: SEMICONDUCTOR COMPONENTS INDUSTRIES, LLC, Phoenix, AZ (US)

(72) Inventor: Sandor Barna, Los Altos, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 70 days.

(21) Appl. No.: 14/870,578

(22) Filed: Sep. 30, 2015

(65) Prior Publication Data

US 2017/0094203 A1    Mar. 30, 2017

(51) Int. Cl.
| | |
|---|---|
| H04N 5/372 | (2011.01) |
| H04N 5/235 | (2006.01) |
| H04N 5/353 | (2011.01) |
| H04N 5/232 | (2006.01) |
| H04N 5/355 | (2011.01) |
| H04N 5/378 | (2011.01) |

(52) U.S. Cl.
CPC ......... *H04N 5/3535* (2013.01); *H04N 5/2327* (2013.01); *H04N 5/2353* (2013.01); *H04N 5/2355* (2013.01); *H04N 5/2357* (2013.01); *H04N 5/35581* (2013.01); *H04N 5/378* (2013.01); *H04N 5/37213* (2013.01)

(58) Field of Classification Search
CPC .... H04N 5/3535; H04N 5/2355; H04N 5/378; H04N 5/2353; H04N 5/35581; H04N 5/37213; H04N 5/2327; H04N 5/2357
See application file for complete search history.

(56) References Cited

U.S. PATENT DOCUMENTS

| 5,515,132 A * | 5/1996 | Iwasaki | G03B 7/09979 |
| | | | 356/215 |
| 2013/0271623 A1 | 10/2013 | Jo | |
| 2015/0009375 A1 | 1/2015 | Agranov et al. | |
| 2015/0237247 A1 | 8/2015 | Hara | |
| 2015/0358570 A1* | 12/2015 | Taniguchi | H04N 5/2357 |
| | | | 348/294 |
| 2016/0182839 A1* | 6/2016 | Shigeta | H04N 5/35581 |
| | | | 348/362 |

FOREIGN PATENT DOCUMENTS

JP    2015-056758    *  3/2015    ............. H04N 5/235

* cited by examiner

*Primary Examiner* — Hung Lam
(74) *Attorney, Agent, or Firm* — Treyz Law Group, P.C.; Joseph F. Guihan (57) ABSTRACT

An image pixel may include a shutter element that is operable in an open state during which a corresponding photodiode accumulates charge and a closed state during which charge is drained from the photodiode. During a first portion of an image frame, the image pixel may operate in a flicker mitigation mode in which a non-continuous exposure period is used. During a second portion of the image frame, the image pixel may operate in a high dynamic range mode in which images are obtained with exposures of varying lengths. To conserve memory requirements, the signal from the flicker mitigation mode may not be sampled until the end of the first exposure of the high dynamic range mode.

20 Claims, 5 Drawing Sheets

IMAGING SYSTEMS WITH FLICKER MITIGATION AND HIGH DYNAMIC RANGE

BACKGROUND

This relates generally to imaging systems, and more particularly, to imaging systems with dynamic shutter functionality.

Modern electronic devices such a cellular telephones, cameras, and computers often use digital image sensors. Imagers (i.e., image sensors) often include a two-dimensional array of image sensing pixels. Each pixel typically includes a photosensor such as a photodiode that receives incident photons (light) and converts the photons into electrical signals.

In conventional imaging systems, image artifacts may be caused by moving objects, moving or shaking camera, flickering lighting, and objects with changing illumination in an image frame. Such artifacts may include, for example, missing parts of an object, edge color artifacts, and object distortion. Examples of objects with changing illumination include light-emitting diode (LED) traffic signs (which can flicker several hundred times per second) and LED brake lights or headlights of modern cars.

While electronic rolling shutter and global shutter modes produce images with different artifacts, the root cause for such artifacts is common for both modes of operation. Typically, image sensors acquire light asynchronously relative to the scenery being captured. This means that portions of an image frame may not be exposed for part of the frame duration. This is especially true for bright scenery when integration times are much shorter than the frame time used. Zones in an image frame that are not fully exposed to dynamic scenery may result in object distortion, ghosting effects, and color artifacts when the scenery includes moving or fast-changing objects. Similar effects may be observed when the camera is moving or shaking during image capture operations.

Conventional imaging systems also may have images with artifacts associated with low dynamic range. Scenes with bright and dark portions may produce artifacts in conventional image sensors, as portions of the image may be over exposed or under exposed.

It would therefore be desirable to be able to provide high dynamic range (HDR) imaging systems for capturing images with minimized artifacts related to moving objects, moving or shaking camera, flickering lighting, and objects with changing illumination.

DETAILED DESCRIPTION

Electronic devices such as digital cameras, computers, cellular telephones, and other electronic devices include image sensors that gather incoming image light to capture an image. The image sensors may include arrays of imaging pixels. The pixels in the image sensors may include photosensitive elements such as photodiodes that convert the incoming image light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the imaging pixels and readout circuitry for reading out image signals corresponding to the electric charge generated by the photosensitive elements.

Each image pixel in a pixel array may include a shutter element for controlling when the photosensitive element acquires charge. For example, when a pixel's shutter element is "open," photocurrent may accumulate on the photosensitive element. When a pixel's shutter element is "closed," the photocurrent may be drained out from the pixel and discarded.

The shutter elements may be operated dynamically by being opened and closed multiple times throughout the duration of an imaging frame. Each cycle of dynamic shutter operation may include a period of time when the shutter is open and a period of time when the shutter is closed. At the end of each cycle, the charge that has been acquired on the photosensitive element during the cycle may be transferred from the photosensitive element to a pixel memory element. By repeating this sequence multiple times, the charge accumulated on the pixel memory element may represent the entire scenery being captured without significantly unexposed "blind" time spots.

Figure 1:
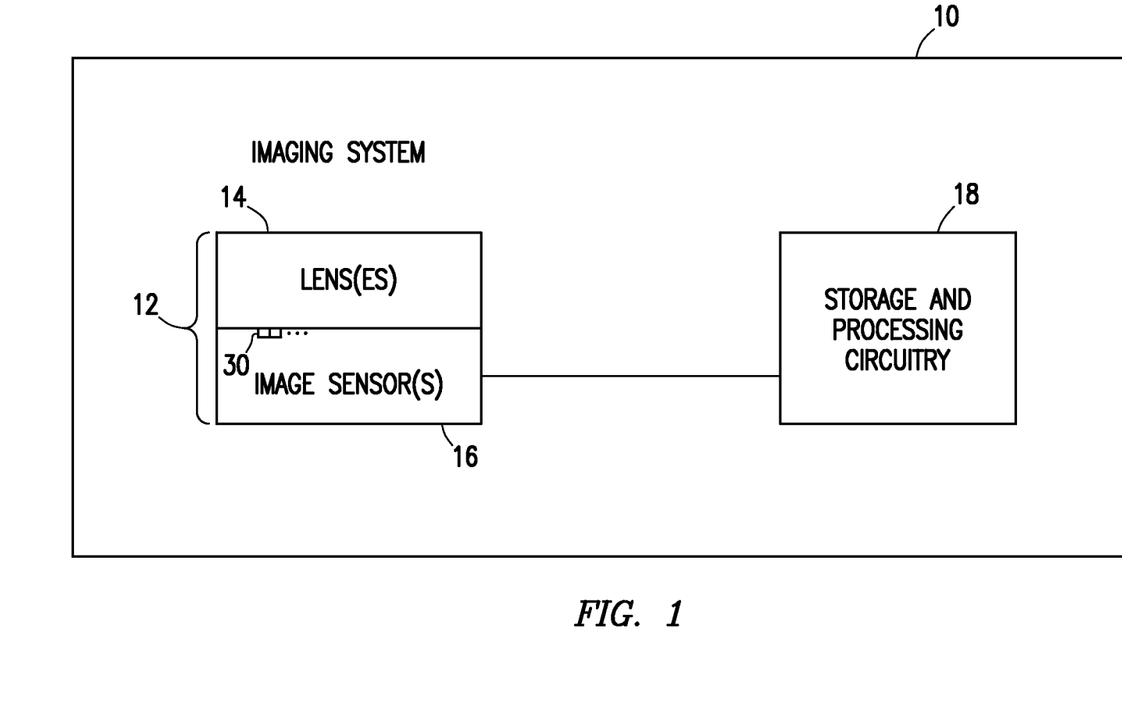
FIG. 1 is a diagram of an illustrative imaging system that may include an image sensor having image pixels with dynamically operated electronic shutters in accordance with an embodiment of the present invention.

FIG. 1 is a diagram of an illustrative imaging system that uses image pixels with dynamically operated shutter elements. Imaging system 10 of FIG. 1 may be a portable electronic device such as a camera, a cellular telephone, a video camera, or other imaging device that captures digital image data. Camera module 12 may be used to convert incoming light into digital image data. Camera module 12 may include one or more lenses 14 and one or more corresponding image sensors 16. Image sensor 16 may be an image sensor integrated circuit die with an array of image pixels 30. Image pixels 30 may each include a shutter element for controlling when charge is acquired on the image pixel.

During image capture operations, lens 14 may focus light from a scene onto an image pixel array in image sensor 16. Image sensor 16 may provide corresponding digital image data to control circuitry such as storage and processing circuitry 18.

Circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be further processed and/or stored using processing circuitry 18. Processed image data may, if desired, be provided to external equipment (e.g., a computer or other device) using wired and/or wireless communications paths coupled to processing circuitry 18. Processing circuitry 18 may be used in controlling the operation of image sensors 16.

Figure 2:
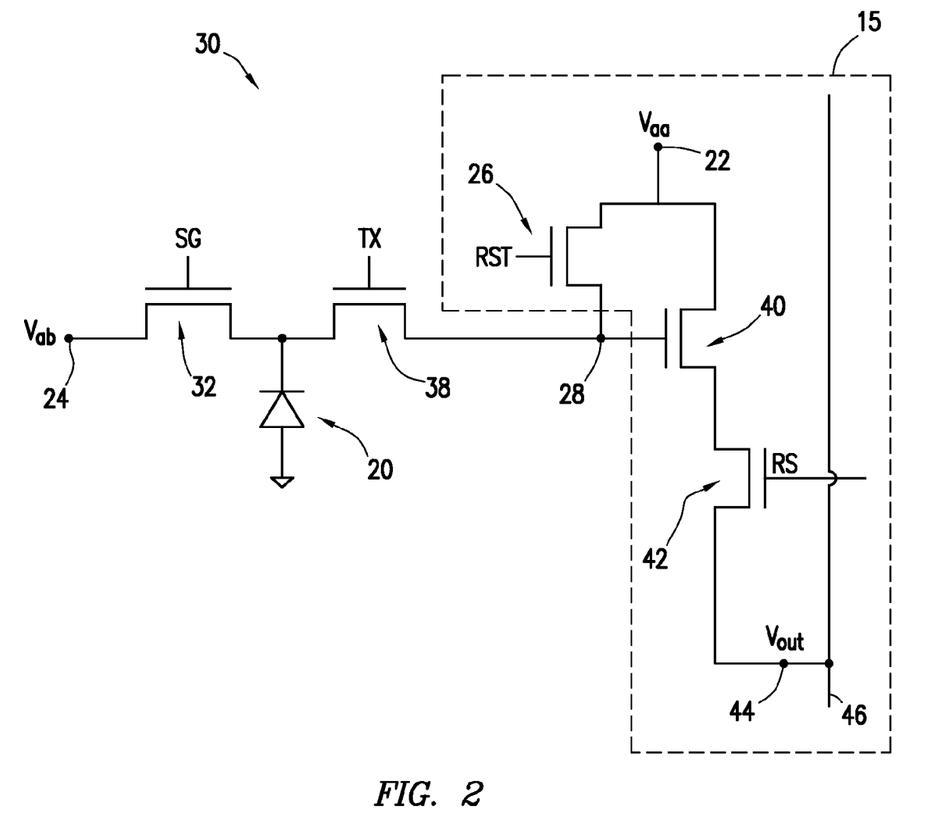
FIG. 2 is a diagram of an image pixel that can be used to support a dynamic shutter mode of operation in accordance with an embodiment of the present invention.

FIG. 2 is a circuit diagram of an illustrative image pixel 30. As shown in FIG. 2, pixel 30 includes a photosensitive element such as photodiode 20. A positive power supply voltage Vaa may be supplied at positive power supply terminal 22. A second power supply voltage Vab may be supplied at second power supply terminal 24. Incoming light may be collected by photodiode 20 after passing through a color filter structure. Photodiode 20 generates charge (e.g., electrons) in response to receiving impinging photons. The amount of charge that is collected by photodiode 20 depends on the intensity of the impinging light and the exposure duration (or integration time).

Before an image is acquired, reset control signal RST may be asserted. Asserting signal RST turns on reset transistor 26 and resets charge storage node 28 (sometimes referred to as floating diffusion region FD) to Vaa. Reset control signal RST may then be deasserted to turn off reset transistor 26.

Pixel 30 may include a shutter gate such as shutter gate 32. Shutter gate 32 may have a gate terminal that is controlled by shutter control signal SG. Asserting shutter control signal SG turns on shutter gate 32 and resets photodiode 20 to power supply voltage Vab (e.g., by connecting Vab to photodiode 20 through shutter gate 32). When signal SG is deasserted, photodiode 20 may be allowed to accumulate photo-generated charge.

Because charge is allowed to accumulate on photodiode 20 when signal SG is deasserted (i.e., when SG is low), the OFF state of transistor 32 may correspond to an open electronic shutter for pixel 30. Similarly, because photodiode 20 is reset to power supply voltage Vab when signal SG is asserted (i.e., when SG is high), the ON state of transistor 32 may correspond to a closed electronic shutter for pixel 30. In general, an "open" electronic shutter may be used herein to refer to the state in which photodiode 20 is allowed to accumulate charge (i.e., the state in which transistor 32 is deasserted), whereas a "closed" electronic shutter may be used herein to refer to the state in which photodiode 20 is reset to power supply voltage Vab (i.e., the state in which transistor 32 is asserted).

Pixel 30 may include a transfer gate (transistor) 38. Transfer gate 38 may have a gate terminal that is controlled by transfer control signal TX. Transfer signal TX may be pulsed to transfer charge from photodiode 20 to charge storage region 28. Floating diffusion region 28 may be a doped semiconductor region (e.g., a region in a silicon substrate that is doped by ion implantation, impurity diffusion, or other doping process).

If desired, pixel 30 may have additional storage regions for temporarily storing charge transferred from photodiode 20. For example, an intermediate memory node such as a diffused diode and intermediate transfer gate or any other suitable in-pixel memory configuration may be located between transfer transistor 38 and source follower transistor 40. The configuration of FIG. 2 is merely illustrative.

Pixel 30 may include readout circuitry such as charge readout circuitry 15. Charge readout circuit 15 may include row-select transistor 42 and source-follower transistor 40. Transistor 42 may have a gate that is controlled by row select signal RS. When signal RS is asserted, transistor 42 is turned on and a corresponding signal Vout (e.g. an output signal having a magnitude that is proportional to the amount of charge at floating diffusion node 28), is passed onto output path 44.

Shutter gate 32 may be pulsed dynamically during a frame capture. Each cycle of dynamic shutter operation may include a period of time when shutter 32 is open (i.e., when SG is low) and a period of time when shutter 32 is closed (i.e., when SG is high). When shutter 32 is closed, charge is drained from pixel 30 and discarded. When shutter 32 is open, charge is acquired on photodiode 20. At the end of each cycle, transfer gate TX may be pulsed to transfer charge that has accumulated on photodiode 20 during the cycle to charge storage region 28.

In a typical image pixel array configuration, there are numerous rows and columns of pixels 30. A column readout path such as output line 46 may be associated with each column of pixels 30 (e.g. each image pixel 30 in a column may be coupled to output line 46 through an associated row-select transistor 42). Signal RS may be asserted to read out signal Vout from a selected image pixel onto column readout path 46. Image data Vout may be fed to processing circuitry 18 for further processing. The circuitry of FIG. 2 is merely illustrative. If desired, pixel 30 may include other pixel circuitry.

The configuration of FIG. 2 in which pixel 30 includes an electronic shutter formed from shutter gate 32 is merely illustrative. If desired, pixels 30 may be provided with other suitable types of shutter elements, such as mechanical shutter elements or electro-optical shutter elements. For example, each pixel 30 may be provided with a liquid crystal electro-optical shutter (LCEOS). Control signals may be applied to each LCEOS to determine when the LCEOS is transparent (i.e., when the shutter is open) and when the LCEOS is non-transparent (i.e., when the shutter is closed). As another example, pixels 30 may include shutter elements formed from mechanical shutter structures such as micro-electromechanical systems (MEMS) based shutter structures. Configurations in which pixels 30 are provided with electronic shutter elements are merely illustrative and are sometimes described herein as an example.

Figure 3:
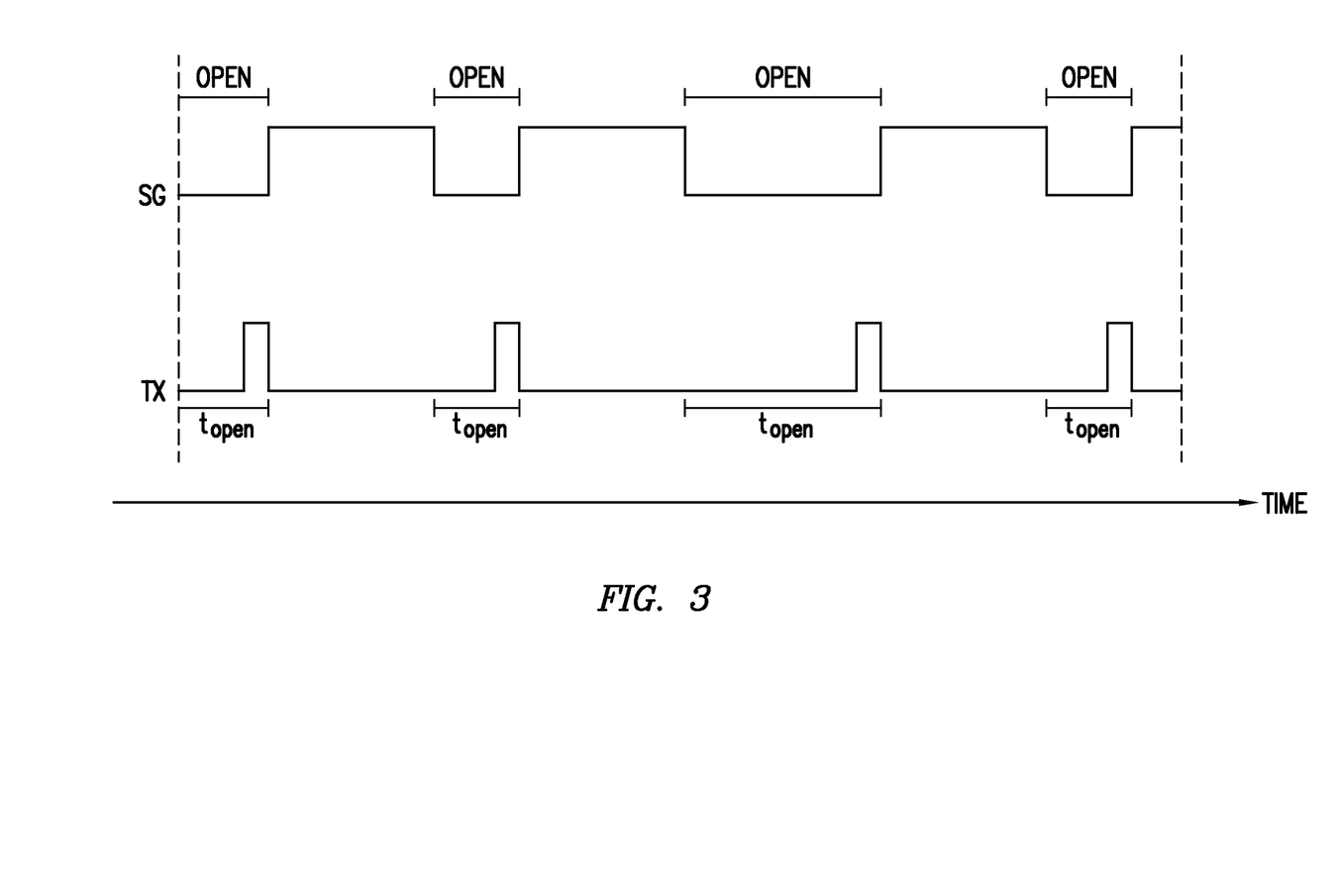
FIG. 3 is a timing diagram showing relevant signal behavior of an illustrative image pixel during an image capture and showing how dynamic shutter operations may be implemented in accordance with an embodiment of the present invention.

FIG. 3 is a timing diagram illustrating how dynamic shutter operation may be implemented in pixel 30. As shown in FIG. 3, shutter control signal SG may be pulsed multiple times during an image frame. When signal SG is low, shutter 32 is OPEN and charge is allowed to accumulate on photodiode 20. When SG is high, shutter 32 is closed. A "shutter cycle" may be used herein to refer to a period that includes one closed period in which SG is high and one OPEN period in which SG is low.

At the end of each OPEN period, signal TX is pulsed to transfer the charge that was accumulated during the OPEN period to floating diffusion node 28. Each OPEN period may have any desired duration. Charge acquisition time $t_{open}$ for each cycle is defined as the time between the falling edge of the SG pulse and the falling edge of the subsequent TX pulse. The charge acquisition times in a given image frame need not have the same duration $t_{open}$. The total charge acquisition time T of pixel 30 during an image frame capture (sometimes referred to as the total pixel exposure time T) may be defined as the sum of all $t_{open}$ during the frame acquisition time.

Charge may be transferred from photodiode 20 to floating diffusion node 28 using a short TX pulse at the end of each shutter cycle. During readout time, accumulated charge on floating diffusion node 28 may be converted to a corresponding pixel signal Vout. In certain embodiments, an intermediate transfer node may be included in pixel 30 in between transfer transistor 38 and source follower transistor 40. In these embodiments, a correlated double sampling (CDS) technique may be used to convert the charge to a corresponding pixel signal Vout. For example, the short TX pulses at the end of each shutter cycle may transfer charge from photodiode 20 to the intermediate transfer node. Once sampling is desired, floating diffusion region 28 may be reset and the charge at the floating region 28 sampled. The charge from the intermediate transfer node may then be transferred to floating diffusion 28 and the charge at floating diffusion region 28 may be sampled again. This way, the reset noise will be accounted for.

Because $t_{open}$ is much shorter than the length of an image frame, multiple shutter cycles may fit into a portion of a frame length or into the entire frame length without compromising pixel exposure timing (i.e., while maintaining the desired total pixel exposure time T).

By breaking up the total exposure time T during an image frame into shorter, non-continuous integration periods, image artifacts caused by moving objects, flickering lighting, and objects with changing illumination may be minimized without compromising pixel exposure time (i.e., while maintaining the desired total exposure time T).

Figure 4:
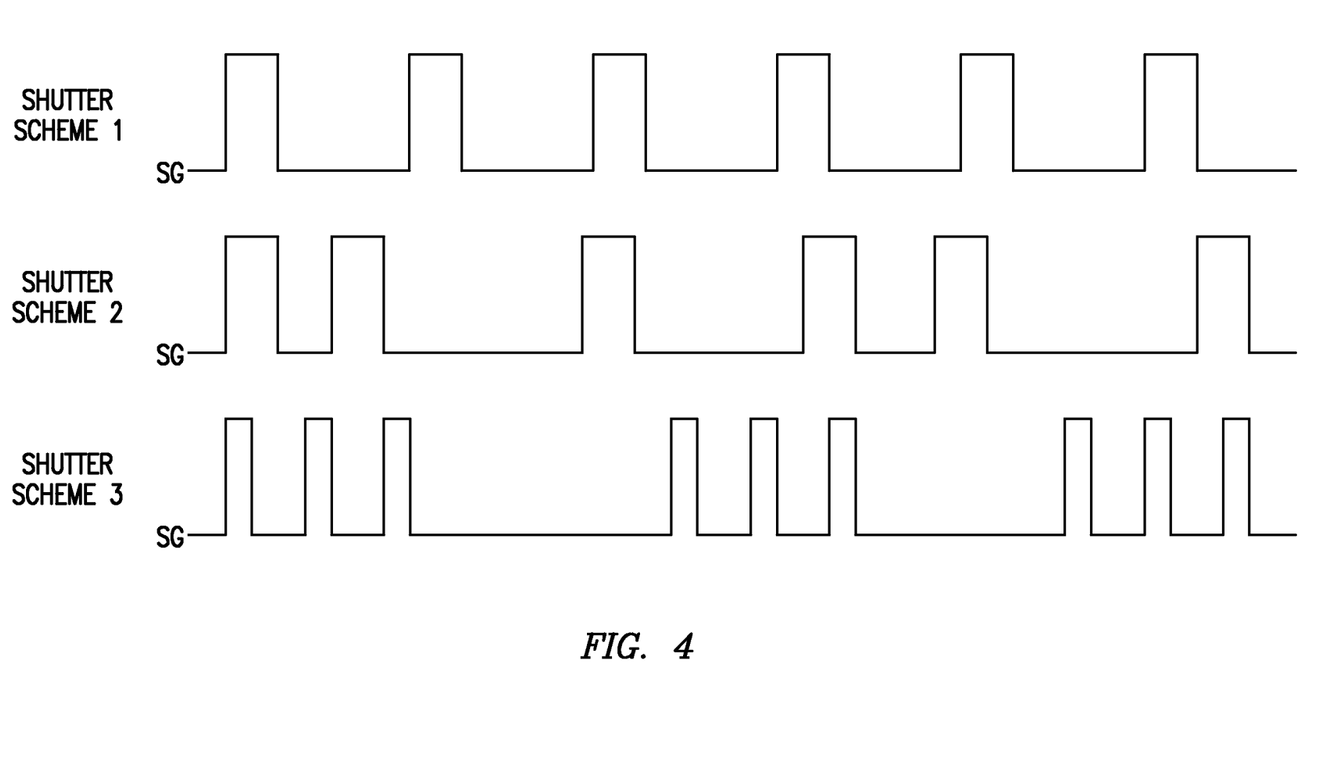
FIG. 4 is a timing diagram showing illustrative shutter signal patterns for a dynamic shutter such as an even shutter signal pattern, a random shutter signal pattern, and a synchronized burst shutter signal pattern in accordance with an embodiment of the present invention.

The timing of shutter pulses may have any suitable pattern. FIG. 4 is a timing diagram illustrating different examples of shutter signal schemes for operating shutter 32 of pixel 30. In shutter scheme 1, signal SG is pulsed at even (uniform) intervals. In shutter scheme 2, signal SG is pulsed at random intervals. In shutter scheme 3, signal SG is pulsed in even bursts, where each burst includes multiple pulses at even intervals. If desired, other shutter schemes may be used. For example, signal SG may be pulsed in random bursts, where each burst includes multiple pulses and where the bursts occur at random intervals. The schemes shown in FIG. 4 are merely illustrative.

In certain applications, it may also be desirable for image sensor 16 to have high dynamic range (HDR). In high dynamic range images, an image sensor may combine images taken with varying exposure times into a single image to avoid over exposure or under exposure.

Figure 5:
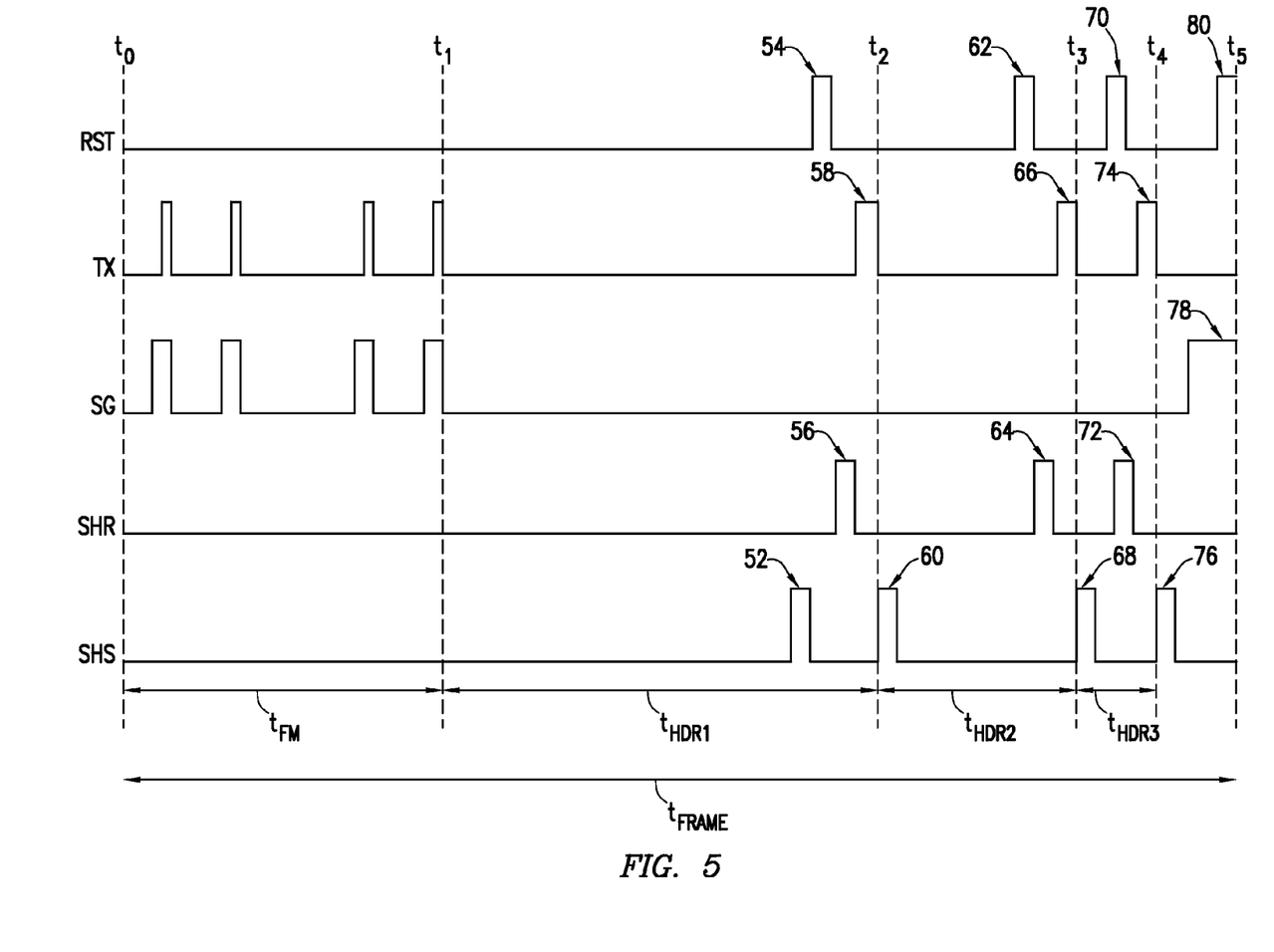
FIG. 5 is a timing diagram illustrating how dynamic shutter operation for flicker mitigation (FM) may be combined with a high dynamic range (HDR) mode in accordance with an embodiment of the present invention.

FIG. 5 shows a timing diagram illustrating how dynamic shutter operation for flicker mitigation (FM) may be combined with a high dynamic range (HDR) mode. FIG. 5 shows a single frame that occurs over $t_{FRAME}$ (from $t_0$ to $t_5$). Each frame may begin with a period of time devoted towards flicker mitigation ($t_{FM}$). In FIG. 5, $t_{FM}$ is shown as occurring between $t_0$ and $t_1$. As described in connection with FIGS. 2-4, shutter 32 of pixel 30 may be operated to break up the total exposure time into shorter, non-continuous integration periods during $t_{FM}$. The shutter scheme in FIG. 5 during $t_{FM}$ is purely illustrative. If desired, shutter scheme 1 of FIG. 4 may be used, shutter scheme 2 of FIG. 4 may be used, shutter scheme 3 of FIG. 4 may be used, or another desired shutter scheme may be used. Signal SG in FIG. 5 may be pulsed at uniform intervals, at random intervals, or a combination of random and uniform intervals during $t_{FM}$.

After $t_{FM}$ is complete, the pixel may be used to obtain a high dynamic range image. The shutter may be opened at $t_1$ to begin a first HDR exposure time ($t_{HDR1}$) that lasts from $t_1$ to $t_2$. After the first HDR exposure time, a second HDR exposure time ($t_{HDR2}$) may begin that lasts from $t_2$ to $t_3$. Finally, after the second HDR exposure time a third HDR exposure time ($t_{HDR3}$) may begin that lasts from $t_3$ to $t_4$.

The subsets of $t_{FRAME}$ may have any desired durations. For example, $t_{FRAME}$ may be approximately 33.3 milliseconds (which corresponds to the sensor operating at 30 frames per second). A first portion of the frame may be devoted towards flicker mitigation. For example, $t_{FM}$ may be approximately 10 milliseconds. The remaining time (23.3 milliseconds) may be divided among the HDR exposure times. For example, $t_{HDR1}$ may be approximately 21.9 milliseconds, $t_{HDR2}$ may be approximately 1.4 milliseconds, and $t_{HDR3}$ may be approximately 0.1 milliseconds. The first exposure time $t_{HDR1}$ may be longer than $t_{HDR2}$ and $t_{HDR3}$, and the second exposure time $t_{HDR2}$ may be longer than $t_{HDR3}$. The first exposure time $t_{HDR1}$ may be ten times longer than $t_{HDR2}$, sixteen times longer than $t_{HDR2}$, or more than ten times longer than $t_{HDR2}$. The first exposure time $t_{HDR1}$ may be one hundred times longer than $t_{HDR3}$, two hundred and fifty six times longer than $t_{HDR3}$, or more than one hundred times longer than $t_{HDR3}$. The second exposure time $t_{HDR2}$ may be ten times longer than $t_{HDR3}$, sixteen times longer than $t_{HDR3}$, or more than ten times longer than $t_{HDR3}$. In general, $t_{HDR1}$, $t_{HDR2}$ and $t_{HDR3}$, may have any desired durations.

As previously described, the charge accumulated during each open period of the shutter may be transferred from photodiode 20 to floating diffusion node 28 using a short TX pulse at the end of each shutter cycle. At the end of $t_{FM}$, floating diffusion node 28 may have accumulated the charge of the entire exposure time T from $t_{FM}$. In certain embodiments, this charge may be sampled immediately after $t_{FM}$ ends (e.g., at $t_1$). Once sampled, accumulated charge on floating diffusion node 28 may be converted to a corresponding pixel signal $V_{out}$ by charge readout circuit 15. However, after the charge is sampled the $V_{out}$ value will have to be stored. Sampling the charge at $t_1$ may require storing $V_{out}$ from $t_1$ to $t_5$. This may require a large amount of memory, which may increase the cost and size of the image sensor.

In order to minimize the amount of memory required for image sensor 16, the charge accumulated during $t_{FM}$ may not be sampled until the end of $t_{HDR1}$ (e.g., close to $t_2$ or after the majority of $t_{HDR1}$ has passed). At the end of $t_{HDR1}$, sample-and-hold signal SHS may be asserted to sample the pixel signal with the accumulated charge from $t_{FM}$ (assertion 52). After asserting sample-and-hold signal SHS, reset signal RST may be asserted at assertion 54 to reset the charge at floating diffusion node 28 to power supply voltage Vaa. The reset signal may then be sampled by asserting sample-and-hold reset signal SHR at assertion 56. Sampling the charge at the floating diffusion both before and after charge transfer may be referred to as correlated double sampling (CDS). CDS may be used to eliminate noise associated with resetting floating diffusion 28. After sampling the reset signal, the transfer control signal TX may be asserted at assertion 58. Charge that had been accumulating on photodiode 20 during $t_{HDR1}$ will then be transferred to floating diffusion node 28.

Assertions 52, 54, 56, and 58 may occur in quick succession. For example, assertion 54 may take place immediately after assertion 52, assertion 56 may take place immediately after assertion 54, and assertion 58 may take place immediately after assertion 56. However, this example is merely illustrative. In certain embodiments there may be short periods of time between each assertion (e.g., less than 3 milliseconds, less than 1 milliseconds, less than 0.1 milliseconds, less than 0.01 milliseconds, etc.). The time period between each assertion may vary or be uniform. There may be no gap between each assertion (e.g., each subsequent assertion begins as soon as the previous assertion ends).

After transferring the charge accumulated during $t_{HDR1}$ to the floating diffusion, the second HDR exposure period $t_{HDR2}$ may begin. The second HDR exposure may last from $t_2$ to $t_3$. At $t_2$, the charge accumulated at the floating diffusion node from $t_{HDR1}$ may be sampled by asserting sample-and-hold signal SHS at assertion 60. Subsequently, reset signal RST may be asserted at assertion 62 to reset the charge at floating diffusion node 28 to power supply voltage Vaa. The reset signal may then be sampled by asserting sample-and-hold reset signal SHR at assertion 64. Transfer control signal TX may then be asserted at assertion 66 to transfer charge that had accumulated on photodiode 20 during $t_{HDR2}$ to floating diffusion node 28.

In certain embodiments, assertion 60 may occur immediately after assertion 58. In other embodiments, there be a short period of time between assertions 58 and 60 (e.g., more than 0.01 milliseconds, less than 0.01 milliseconds, more than 0.1 milliseconds, more than 1 millisecond, more than 5 milliseconds, etc.).

Assertions 62, 64, and 66, may occur in quick succession. For example, assertion 64 may take place immediately after assertion 62, and assertion 66 may take place immediately after assertion 64. However, this example is merely illustrative. In certain embodiments there may be short periods of time between each assertion (e.g., less than 3 milliseconds, less than 1 milliseconds, less than 0.1 milliseconds, less than 0.01 milliseconds, etc.). The time period between each assertion may vary or be uniform. There may be no gap between each assertion (e.g., each subsequent assertion begins as soon as the previous assertion ends).

After transferring the charge accumulated during $t_{HDR2}$ to the floating diffusion, the third HDR exposure period $t_{HDR3}$ may begin. The third HDR exposure may last from $t_3$ to $t_4$. At $t_3$, the charge accumulated at the floating diffusion node from $t_{HDR2}$ may be sampled by asserting sample-and-hold signal SHS (assertion 68). Subsequently, reset signal RST may be asserted at assertion 70 to reset the charge at floating diffusion node 28 to power supply voltage Vaa. The reset signal may then be sampled by asserting sample-and-hold reset signal SHR at assertion 72. Transfer control signal TX may then be asserted at assertion 74 to transfer charge that had accumulated on photodiode 20 during $t_{HDR3}$ to floating diffusion node 28.

In certain embodiments, assertion 68 may occur immediately after assertion 66. In other embodiments, there be a short period of time between assertions 66 and 68 (e.g., more than 0.01 milliseconds, less than 0.01 milliseconds, more than 0.1 milliseconds, more than 1 millisecond, more than 5 milliseconds, etc.).

Assertions 70, 72, and 74, may occur in quick succession. For example, assertion 72 may take place immediately after assertion 70, and assertion 74 may take place immediately after assertion 72. However, this example is merely illustrative. In certain embodiments there may be short periods of time between each assertion (e.g., less than 3 milliseconds, less than 1 milliseconds, less than 0.1 milliseconds, less than 0.01 milliseconds, etc.). The time period between each assertion may vary or be uniform. There may be no gap between each assertion (e.g., each subsequent assertion begins as soon as the previous assertion ends).

At $t_4$, the charge accumulated at the floating diffusion node from $t_{HDR3}$ may be sampled by asserting sample-and-hold signal SHS (assertion 76). Between $t_4$ and the end of the frame ($t_5$), shutter control signal SG and reset signal RST may be asserted (assertions 78 and 80, respectively) to ensure that photodiode 20 and floating diffusion 28 are cleared of all charge when the frame ends and a subsequent frame begins.

In certain embodiments, assertion 76 may occur immediately after assertion 74. In other embodiments, there be a short period of time between assertions 76 and 74 (e.g., more than 0.01 milliseconds, less than 0.01 milliseconds, more than 0.1 milliseconds, more than 1 millisecond, more than 5 milliseconds, etc.).

The timing sequence illustrated in FIG. 5 may allow for a HDR image with flicker mitigation to be captured in a single image frame with minimal memory requirements.

In various embodiments of the invention, a pixel may include a photodiode, a charge storage region, and a charge readout circuit coupled between the charge storage region and an output line. A method for capturing image data for the image pixel during an image frame may include accumulating an amount of charge in a flicker mitigation mode for a first time period with the photodiode. The amount of charge may be stored in the charge storage region. The method may also include accumulating an additional amount of charge in a high dynamic range mode for a second time period that is subsequent to the first time period with the photodiode. The second time period may include a first high dynamic range exposure and a second high dynamic range exposure subsequent to the first high dynamic range exposure. The method may also include using the charge readout circuit to supply a first signal to the output line corresponding to the amount of charge on the charge storage region at the end of first high dynamic range exposure.

The image pixel may also include a power supply terminal, a first transistor coupled between the power supply terminal and the photodiode, and a second transistor coupled between the photodiode and the charge storage region. Accumulating the amount of charge in the flicker mitigation mode for the first time period may include accumulating the amount of charge over an exposure time with the photodiode. The exposure time may be non-continuous and may include multiple integration periods that are each shorter than the exposure time. The flicker mitigation mode may also include resetting the photodiode using the first transistor prior to each integration period and transferring a portion of the amount of charge from the photodiode to the charge storage region using the second transistor at the end of each integration period.

Transferring the portion of the amount of charge from the photodiode to the charge storage region at the end of each integration period may include transferring all collected charge that accumulated on the photodiode during the integration period to the charge storage region. The flicker mitigation mode may also include asserting the first transistor in between the integration periods. When the first transistor is asserted, charge may be drained from the photodiode. The flicker mitigation mode may also include deasserting the first transistor during the integration periods. When the first transistor is deasserted, charge may accumulate on the photodiode.

The method for capturing image data with the image pixel during the image frame may also include resetting the amount of charge at the charge storage region with a reset transistor after using the charge readout circuit to supply the first signal to the output line corresponding to the amount of charge on the charge storage region, supplying a second signal to the output line corresponding to the amount of charge on the charge storage region after resetting the amount of charge at the charge storage region with the reset transistor, transferring an amount of charge that accumulated during the first high dynamic range exposure to the charge storage region with a transfer transistor after supplying the second signal to the output line corresponding to the amount of charge on the charge storage region, and supplying a third signal to the output line corresponding to the amount of charge that accumulated during the first high dynamic range exposure after transferring the amount of charge that accumulated during the first high dynamic range exposure to the charge storage region. The first high dynamic range exposure may be more than ten times longer than the second high dynamic range exposure.

In various embodiments of the invention, an image pixel may include a photodiode, a shutter element, a charge storage region, a transfer transistor coupled between the charge storage region and the photodiode, and a charge readout circuit coupled between the charge storage region and an output line. The shutter element may be operable in an open state during which the photodiode accumulates charge and a closed state during which charge is drained from the photodiode.

A method for capturing image data for the image pixel during an image frame may include accumulating charge during a first exposure period during a first time period. The first exposure period may be non-continuous and include a plurality of integration periods. The shutter element may be in the open state during each integration period and in the closed state in between the integration periods. The charge accumulated during the first exposure period may be transferred to the charge storage region with the transfer transistor. At the end of the first time period, the shutter element may be placed in the open state. During a second time period subsequent to the first time period, charge may be accumulated during a second exposure period. After the majority of the second time period has passed, a first signal may be supplied to the output line corresponding to the charge accumulated during the first exposure period.

The foregoing is merely illustrative of the principles of this invention and various modifications can be made by those skilled in the art without departing from the scope and spirit of the invention.

What is claimed is:

1. A method for capturing image data for an image pixel during an image frame, wherein the image pixel comprises a photodiode, a charge storage region, and a charge readout circuit coupled between the charge storage region and an output line, the method comprising:
   with the photodiode, accumulating an amount of charge in a flicker mitigation mode for a first time period, wherein the amount of charge is stored in the charge storage region;
   with the photodiode, accumulating an additional amount of charge in a high dynamic range mode for a second time period that is subsequent to the first time period, wherein the second time period comprises a first high dynamic range exposure and a second high dynamic range exposure subsequent to the first high dynamic range exposure; and
   at the end of first high dynamic range exposure, using the charge readout circuit to supply a first signal to the output line corresponding to the amount of charge on the charge storage region.

2. The method defined in claim 1, wherein the image pixel further comprises a power supply terminal, a first transistor coupled between the power supply terminal and the photodiode, and a second transistor coupled between the photodiode and the charge storage region, and wherein accumulating the amount of charge in the flicker mitigation mode for the first time period comprises:
   with the photodiode, accumulating the amount of charge over an exposure time, wherein the exposure time is non-continuous and comprises multiple integration periods that are each shorter than the exposure time;
   prior to each integration period, resetting the photodiode using the first transistor; and
   at the end of each integration period, transferring a portion of the amount of charge from the photodiode to the charge storage region using the second transistor.

3. The method defined in claim 2, wherein transferring the portion of the amount of charge from the photodiode to the charge storage region at the end of each integration period comprises transferring all collected charge that accumulated on the photodiode during the integration period to the charge storage region.

4. The method defined in claim 2, further comprising:
   asserting the first transistor in between the integration periods, wherein when the first transistor is asserted, charge is drained from the photodiode.

5. The method defined in claim 4, further comprising:
   deasserting the first transistor during the integration periods, wherein when the first transistor is deasserted, charge accumulates on the photodiode.

6. The method defined in claim 1, further comprising:
   after using the charge readout circuit to supply the first signal to the output line corresponding to the amount of charge on the charge storage region, resetting the amount of charge at the charge storage region with a reset transistor.

7. The method defined in claim 6, further comprising:
   after resetting the amount of charge at the charge storage region with the reset transistor, supplying a second signal to the output line corresponding to the amount of charge on the charge storage region.

8. The method defined in claim 7, further comprising:
   after supplying the second signal to the output line corresponding to the amount of charge on the charge storage region, transferring an amount of charge that accumulated during the first high dynamic range exposure to the charge storage region with a transfer transistor.

9. The method defined in claim 8, further comprising:
   after transferring the amount of charge that accumulated during the first high dynamic range exposure to the charge storage region, supplying a third signal to the output line corresponding to the amount of charge that accumulated during the first high dynamic range exposure.

10. The method defined in claim 1, wherein the first high dynamic range exposure is longer than the second high dynamic range exposure.

11. The method defined in claim 10, wherein the first high dynamic range exposure is more than ten times longer than the second high dynamic range exposure.

12. A method for capturing image data for an image pixel during an image frame, wherein the image pixel comprises a photodiode, a shutter element, a charge storage region, a transfer transistor coupled between the charge storage region and the photodiode, and a charge readout circuit coupled between the charge storage region and an output line, and wherein the shutter element is operable in an open state during which the photodiode accumulates charge and a closed state during which charge is drained from the photodiode, the method comprising:
   during a first time period, accumulating charge during a first exposure period, wherein the first exposure period is non-continuous and comprises a plurality of integration periods, wherein the shutter element is in the open state during each integration period and in the closed state in between the integration periods, and wherein the charge accumulated during the first exposure period is transferred to the charge storage region with the transfer transistor;

at the end of the first time period, placing the shutter element in the open state;

during a second time period subsequent to the first time period, accumulating charge during a second exposure period; and after the majority of the second time period has passed, supplying a first signal to the output line corresponding to the charge accumulated during the first exposure period.

13. The method defined in claim 12, wherein the image pixel comprises a reset transistor, the method further comprising:

after supplying the first signal to the output line corresponding to the charge accumulated during the first exposure period, resetting the charge storage region with the reset transistor.

14. The method defined in claim 13, further comprising:

after resetting the charge storage region with the reset transistor, supplying a second signal to the output line corresponding to a reset level of charge.

15. The method defined in claim 14, further comprising:

after supplying the second signal to the output line corresponding to the reset level of charge, transferring the charge accumulated during the second exposure period to the charge storage region.

16. The method defined in claim 15, further comprising:

after transferring the charge accumulated during the second exposure period to the charge storage region, supplying a third signal to the output line corresponding to the charge accumulated during the second exposure period.

17. The method defined in claim 16, wherein transferring charge accumulated during the second exposure period to the charge storage region comprises transferring charge accumulated during the second exposure period to the charge storage region during the second time period, and wherein supplying the third signal to the output line corresponding to the charge accumulated during the second exposure period comprises supplying the third signal to the output line corresponding to the charge accumulated during the second exposure period during a third time period that is subsequent to the second time period.

18. The method defined in claim 17, further comprising:

during the third time period, accumulating charge during a third exposure period, wherein the third exposure period is shorter than the second exposure period.

19. A method for capturing image data for an image pixel during an image frame, wherein the image pixel comprises a photodiode and a charge readout circuit coupled to an output line, the method comprising:

with the photodiode, accumulating a first amount of charge in a flicker mitigation mode for a first time period;

with the photodiode, accumulating a second amount of charge in a first high dynamic range exposure of a high dynamic range mode, wherein the first high dynamic range exposure is subsequent the first time period;

with the photodiode, accumulating a third amount of charge in a second high dynamic range exposure of the high dynamic range mode, wherein the second high dynamic range exposure is subsequent the first high dynamic range exposure; and with the charge readout circuit, supplying a first signal to the output line corresponding to the first amount of charge at the end of the first high dynamic range exposure.

20. The method defined in claim 19, further comprising:

with the charge readout circuit, supplying a second signal to the output line corresponding to the second amount of charge during the second high dynamic range exposure.

* * * * *